United States Patent
Choi (10) Patent No.: US 11,333,185 B2
(45) Date of Patent: May 17, 2022

(54) MOUNTING STRUCTURE FOR BEDSTEAD

(71) Applicant: Inno-Sports Co., Ltd, Xiamen (CN)

(72) Inventor: Kwan Jun Choi, Xiamen (CN)

(73) Assignee: Inno-Sports Co., Ltd, Xiamen (CN)

( * ) Notice: Subject to any disclaimer, the term of this patent is extended or adjusted under 35 U.S.C. 154(b) by 106 days.

(21) Appl. No.: 16/882,776

(22) Filed: May 26, 2020

(65) Prior Publication Data

US 2020/0378426 A1 Dec. 3, 2020

(30) Foreign Application Priority Data

May 27, 2019 (CN) .......................... 201920775150.8

(51) Int. Cl.
| | |
|---|---|
| *F16B 12/58* | (2006.01) |
| *A47C 19/02* | (2006.01) |
| *F16B 12/56* | (2006.01) |
| *F16B 12/10* | (2006.01) |

(52) U.S. Cl.
CPC ............ *F16B 12/58* (2013.01); *A47C 19/025* (2013.01); *F16B 12/10* (2013.01); *F16B 12/56* (2013.01); *F16B 2012/106* (2013.01)

(58) Field of Classification Search
CPC .......... F16B 12/58; F16B 12/56; F16B 12/10; F16B 2012/106; A47C 19/025; A47C 23/067
See application file for complete search history.

(56) References Cited

U.S. PATENT DOCUMENTS 3,605,142 A * 9/1971 Weinhart ............. A47C 23/067
  5/238
2004/0129845 A1* 7/2004 Whale ................... E04B 1/2612
  248/201

OTHER PUBLICATIONS

"Clamp." Merriam-Webster, Merriam-Webster, www.merriam-webster.com/dictionary/clamp.*
"Hook." Merriam-Webster, Merriam-Webster, www.merriam-webster.com/dictionary/hook.*
"Beside." Merriam-Webster, Merriam-Webster, www.merriam-webster.com/dictionary/beside.*

* cited by examiner

*Primary Examiner* — David R Hare
*Assistant Examiner* — Madison Emanski
(74) *Attorney, Agent, or Firm* — Bayramoglu Law Offices LLC (57) ABSTRACT

A mounting structure for a bedstead includes a side rail and a cross rail of the bedstead. The side rail and the cross rail are connected by a connecting member. The connecting member includes a body. The body is provided with a first U-shaped groove in which the side rail is clamped. The opening of the first U-shaped groove faces downward. The body lateral to the first U-shaped groove is further provided with a second U-shaped groove in which the cross rail is clamped. The opening of the second U-shaped groove faces sideward. The side rail and the cross rail are quick and easy to connect, and the manufacturing cost can also be reduced.

12 Claims, 7 Drawing Sheets

MOUNTING STRUCTURE FOR BEDSTEAD

CROSS REFERENCE TO THE RELATED APPLICATIONS

This application is based upon and claims priority to Chinese Patent Application No. 201920775150.8, filed on May 27, 2019, the entire contents of which are incorporated herein by reference.

TECHNICAL FIELD

The present invention relates to a mounting structure for a bedstead.

BACKGROUND

Beds are ubiquitous in people's daily life and provide comfortable places for people to rest or sleep. The bed in the prior art generally includes a bedstead, and a cross rail is arranged at the hollow position in the middle of the bedstead to stably support the mattress in place. For the folding bed in the prior art, the bedstead is generally a rectangle formed by two side rails on both sides of the bedstead and two short rails at the front end and the rear end of the bedstead. The side rail and the cross rail are generally perpendicular to each other after being connected. Both the side rail and the cross rail, however, are metal parts and need to be welded together when assembled. This not only increases labor and manufacturing costs, but welding presents risks of injury to persons and property.

SUMMARY

In order to solve the above-mentioned technical problems, an objective of the present invention is to provide a mounting structure for a bedstead.

The present invention is realized by the following technical solutions:

A mounting structure for a bedstead includes a side rail and a cross rail of the bedstead. The side rail and the cross rail are connected by a connecting member. The connecting member includes a body. The body is provided with a first U-shaped groove in which the side rail is clamped. A second U-shaped groove in which the cross rail is clamped, is provided on one side of the body beside the first U-shaped groove. The opening of the second U-shaped groove faces sideward relative to the first U-shaped groove.

In an embodiment of the present invention, the opening of the first U-shaped groove faces downward.

In an embodiment of the present invention, the body includes a first piece body, a second piece body and a third piece body. The first piece body, the second piece body and the third piece body are connected to form the first U-shaped groove. The first piece body and the third piece body are located at two sides of the side rail, respectively, and contact two side end surfaces of the side rail, respectively. The second piece body is located above the side rail and contacts the upper end surface of the side rail.

In an embodiment of the present invention, the first piece body is provided with a first hole, the side rail is provided with a second hole, and the first hole coincides with the second hole. A connecting screw is screwed through the first hole and the second hole.

In an embodiment of the present invention, the end surface of the first piece body and/or the third piece body in contact with the side rail is provided with a protruding column. The side rail is provided with the second hole matched with the protruding column.

In an embodiment of the present invention, the outer diameter of the protruding column gradually increases from one end of the protruding column inserted into the second hole to the other end of the protruding column.

In an embodiment of the present invention, the other end surface of the third piece body is provided with a fourth piece body, a fifth piece body and a sixth piece body, wherein the other end surface of the third piece body is opposite to the end surface of the third piece body in contact with the side rail. The fourth piece body, the fifth piece body and the sixth piece body are connected to form a second U-shaped groove. The fourth piece body and the sixth piece body contact the front end surface and the rear end surface of the cross rail, respectively. The upper end surface of the sixth piece body contacts the lower end surface of the cross rail.

In an embodiment of the present invention, one end of each of the fourth piece body and the sixth piece body away from the fifth piece body is provided with a curved surface.

In an embodiment of the present invention, the opening of the first U-shaped groove faces laterally relative to the side rail.

In an embodiment of the present invention, the body includes a seventh piece body, an eighth piece body, and a ninth piece body. The seventh piece body, the eighth piece body and the ninth piece body are connected to form the first U-shaped groove. The seventh piece body and the ninth piece body are located at the upper side and the lower side of the side rail, respectively, and contact the upper end surface and the lower end surface of the side rail, respectively. The eighth piece body is located at the side of the side rail and contacts the side end surface of the side rail.

The mounting structure for the bedstead of the present invention has the following advantages. 1. The cross rail and the side rail are connected by a connecting member rather than a welding process, which not only diminishes the difficulty in production, but also avoids potential injury to workers during the welding process. 2. The cross rail and the side rail can be quickly, simply and conveniently connected by the snap-fit connection.

BRIEF DESCRIPTION OF THE DRAWINGS

In order to more clearly explain the technical solutions of the present invention, the drawings for the description of the prior art and the embodiments will be briefly illustrated hereinafter. Obviously, the drawings in the following description are only some embodiments of the present invention, and those skilled in the art can also obtain other drawings based on these drawings without creative efforts.

DETAILED DESCRIPTION OF THE EMBODIMENTS

The technical solutions of the embodiments of the present invention will be described clearly and completely below with reference to the drawings in the embodiments of the present invention. Obviously, the described embodiments are only a part of the embodiments of the present invention rather than all the embodiments. Based on the embodiments of the present invention, all other embodiments obtained by those skilled in the art without creative efforts shall fall within the scope of protection of the present invention.

Figure 1:
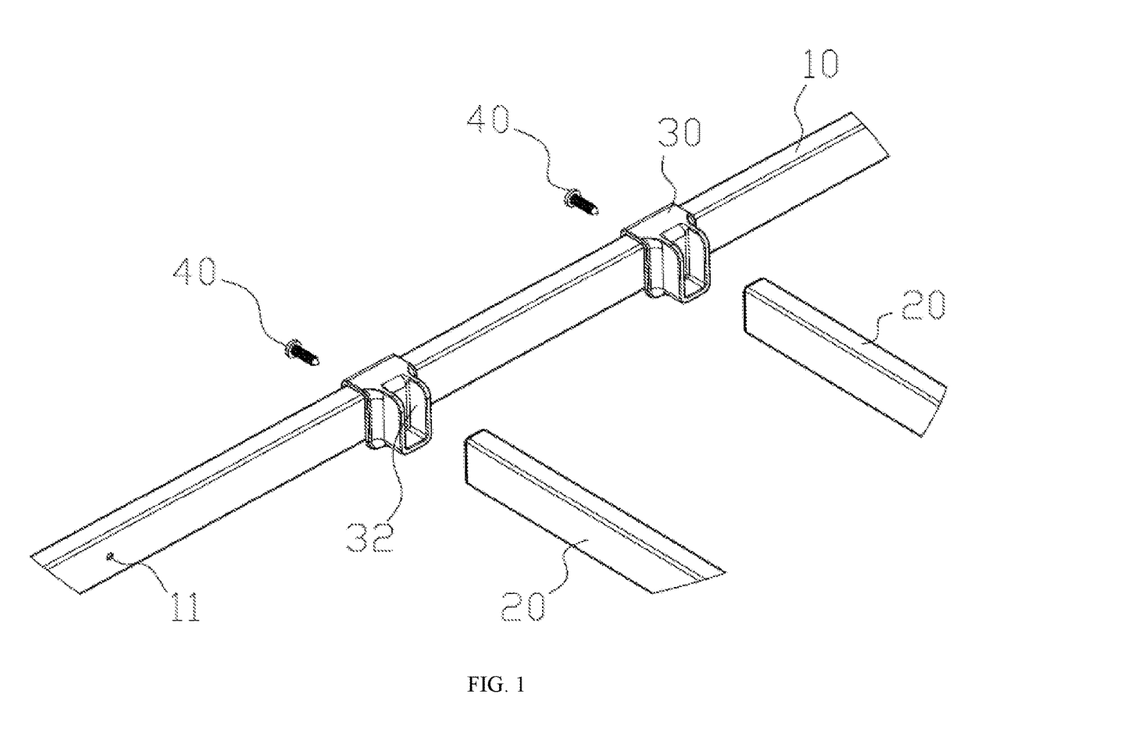
FIG. 1 is a schematic diagram showing the present invention before the installation of the side rail and the cross rail.
Figure 2:
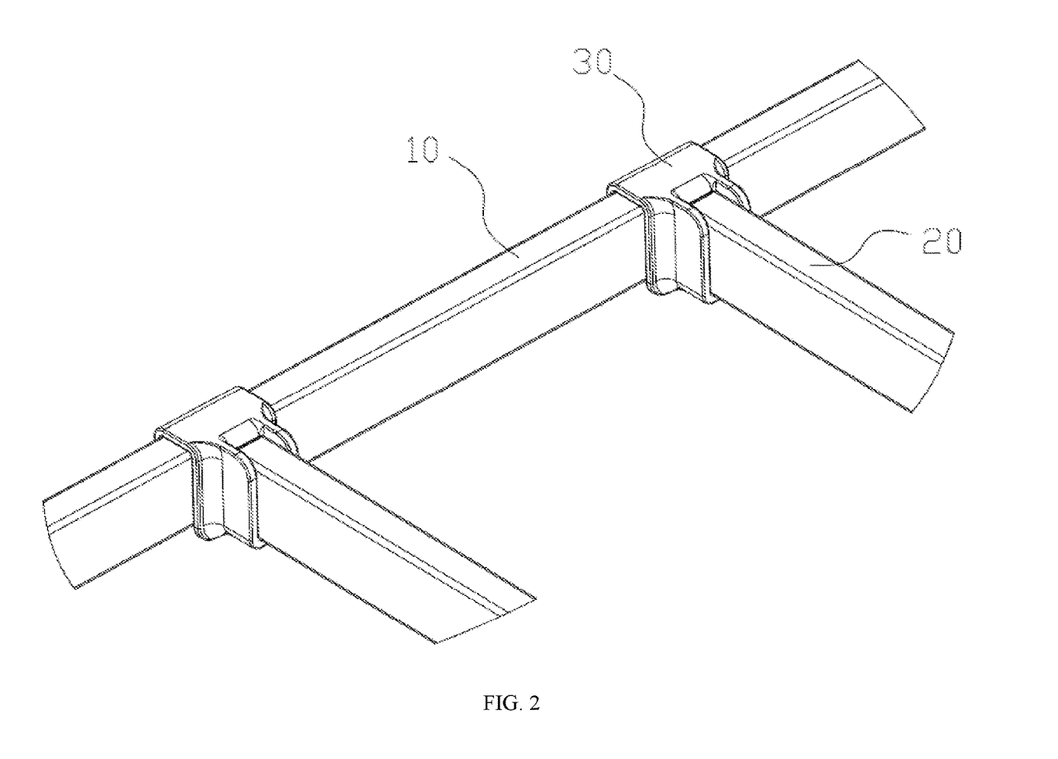
FIG. 2 is a schematic view showing the present invention after the installation of the side rail and the cross rail.
Figure 3:
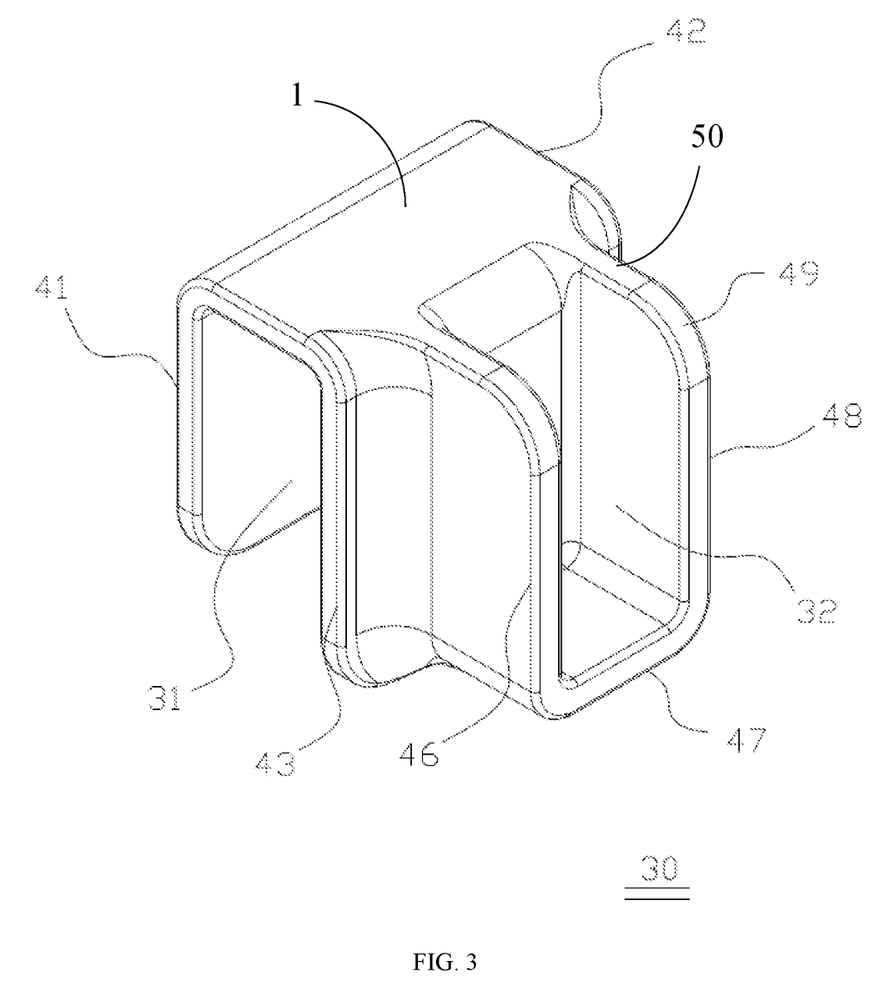
FIG. 3 is a perspective view of the connecting member of the present invention.

Referring to the drawings of the specification, a mounting structure for a bedstead includes the side rail 10 and the cross rail 20 of the bedstead. In normal use, the side rail and the cross rail are perpendicularly connected. The side rail extends along the length direction of the bedstead, that is, at the front end and the rear end of the bedstead. The cross rail is located in the width direction of the bedstead, that is, at the left side end and the right side end of the bedstead. The side rail and the cross rail are connected by the connecting member 30. The connecting member includes a body 1. The body is provided with the first U-shaped groove 31 in which the side rail is clamped. The opening of the first U-shaped groove faces downward. The body 1 lateral to the first U-shaped groove is further provided with the second U-shaped groove 32 in which the cross rail is clamped. The opening of the second U-shaped groove faces sideward. In the present invention, the first U-shaped groove is tightly connected to the side rail, and then one end of the cross rail is clamped in the second U-shaped groove. In use, the bedstead includes two side rails parallel to each other, the connecting member is connected to the corresponding position of each side rail, and then the two ends of the cross rail are connected to the second U-shaped grooves of the two connecting members, respectively.

Specifically, the body 1 includes the first piece body 41, the second piece body 42 and the third piece body 43. The first piece body, the second piece body and the third piece body are connected to form the first U-shaped groove. The first piece body and the third piece body are located at the two sides of the side rail, respectively, and contact two side end surfaces of the side rail, respectively. The second piece body is located above the side rail and contacts the upper end surface of the side rail.

Figure 4:
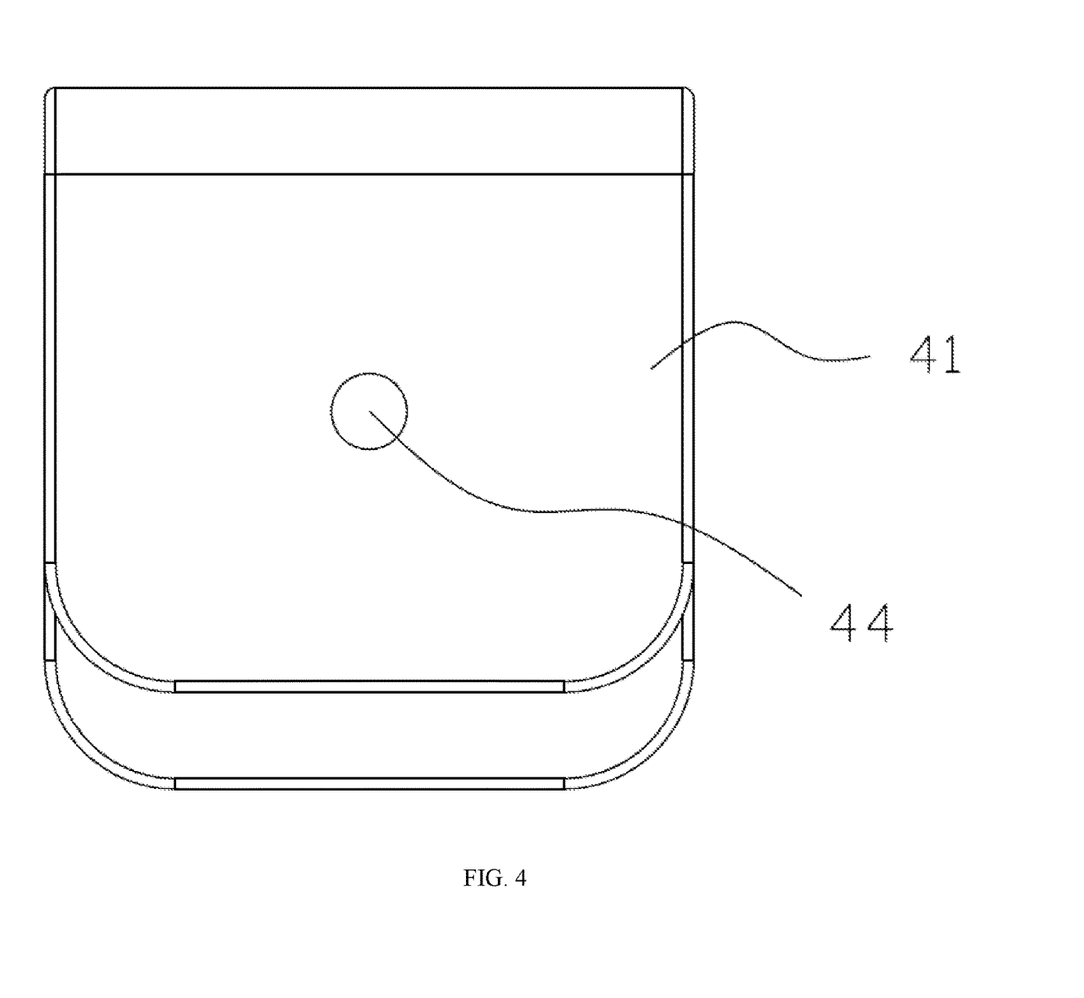
FIG. 4 is a schematic diagram showing the connecting member according to the first embodiment of the present invention.

In the first embodiment of the present invention, the first piece body is provided with the first hole 44, the side rail is provided with the second hole 11, and the first hole 44 coincides with the second hole 11. The connecting screw 40 is screwed through the first hole and the second hole. Alternatively, the third piece body can also be provided with a first hole corresponding to the first hole of the first piece body.

Figure 5:
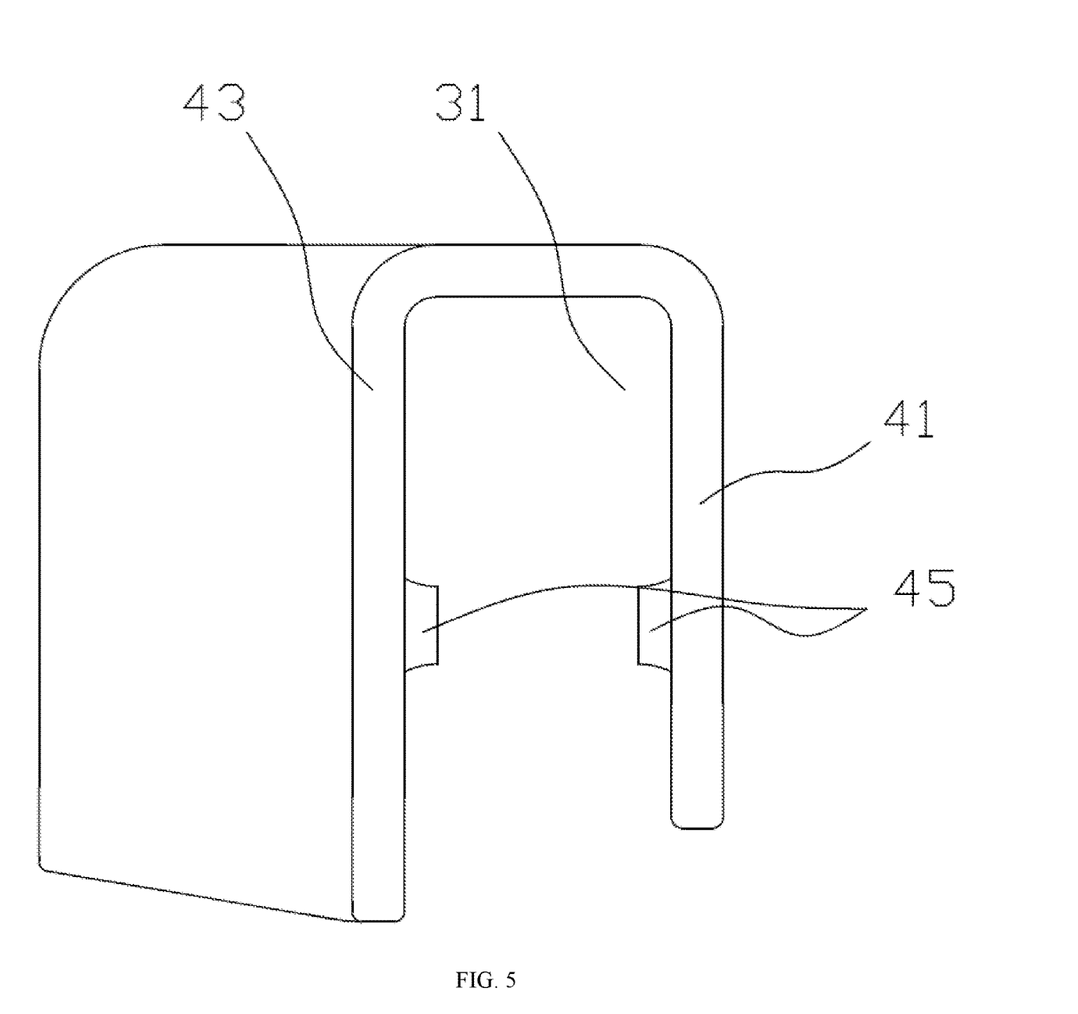
FIG. 5 is a schematic diagram showing the connecting member according to the second embodiment of the present invention.

In the second embodiment of the present invention, the end surface of the first piece body and/or the third piece body in contact with the side rail is provided with the protruding column 45. The side rail is provided with the second hole that can be matched with the protruding column. The outer diameter of the protruding column gradually increases from one end inserted into the second hole to the other end, to allow the protruding column to smoothly slide into and be clamped inside the second hole. In other words, the two ends of the protruding column form a guide surface, and the guide surface can be a curved surface.

Further, the other end surface of the third piece body is provided with the fourth piece body 46, the fifth piece body 47 and the sixth piece body 48, wherein the other end surface of the third piece body is opposite to the end surface of the third piece body in contact with the side rail. The fourth piece body, the fifth piece body and the sixth piece body are connected to form the second U-shaped groove. The fourth piece body and the sixth piece body contact the front end surface 21 and the rear end surface 22 of the cross rail, respectively. The upper end surface 50 of the sixth piece body contacts the lower end surface 23 of the cross rail.

One end of each of the fourth piece body and the sixth piece body away from the fifth piece body is provided with the curved surface 49.

Figure 6:
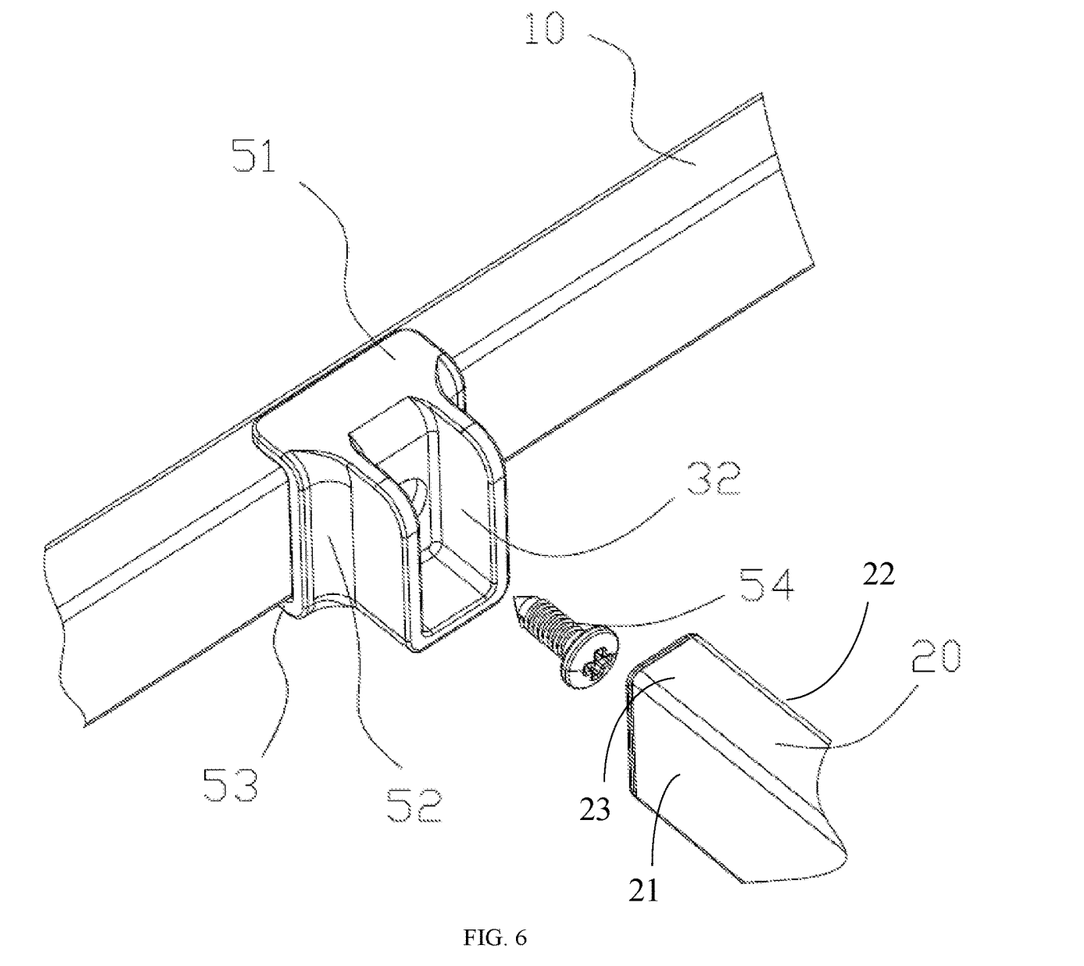
FIG. 6 is a schematic diagram showing the fit of the connecting member according to the third embodiment of the present invention.
Figure 7:
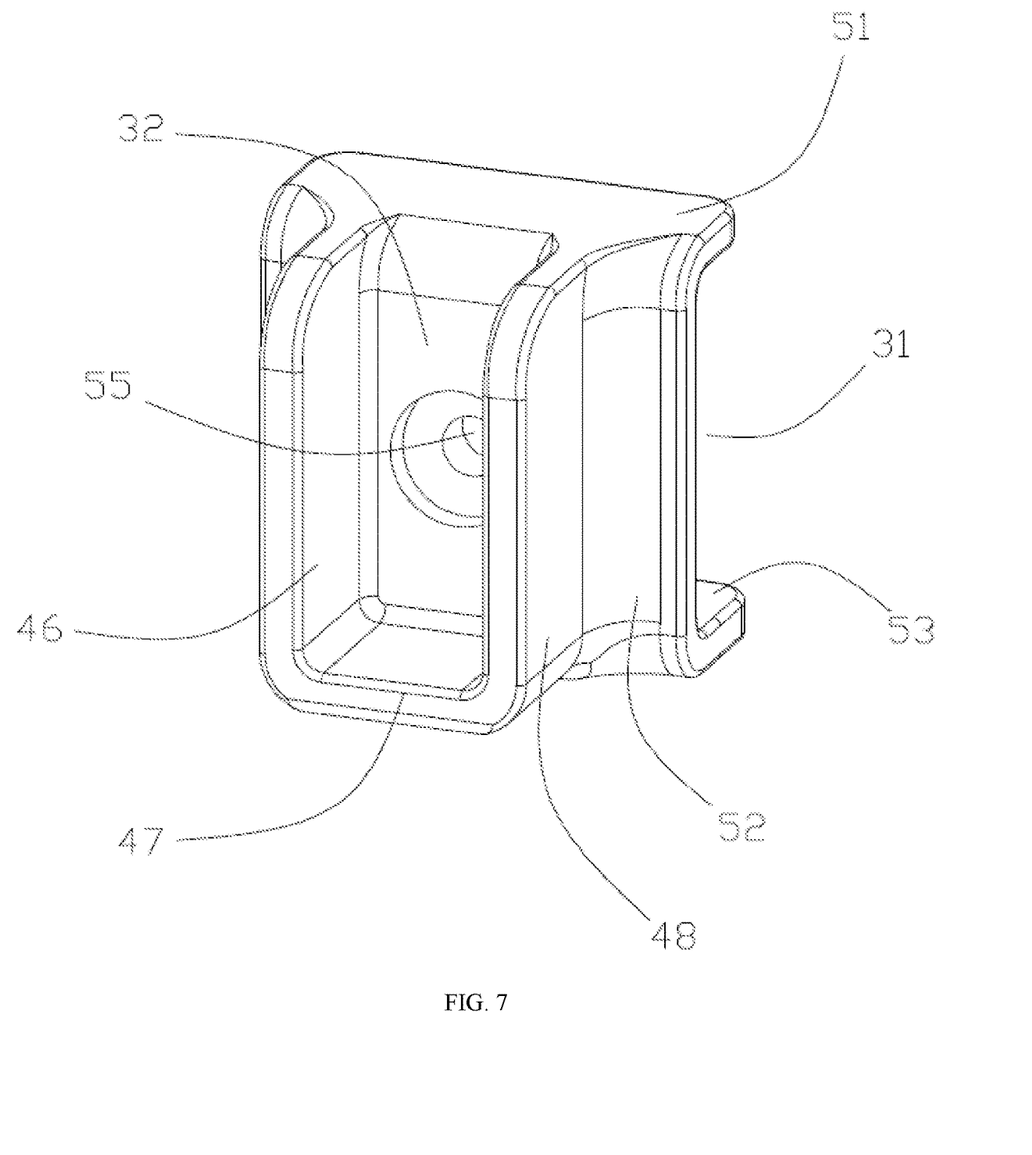
FIG. 7 is a schematic diagram showing the connecting member according to the third embodiment of the present invention.

In the third embodiment of the present invention, referring to the drawings in the specification, the opening of the first U-shaped groove faces laterally relative to the side rail. In the present embodiment, the body 1 includes the seventh piece body 51, the eighth piece body 52 and the ninth piece body 53. The seventh piece body 51, the eighth piece body 52 and the ninth piece body 53 are connected to form the first U-shaped groove. The seventh piece body and the ninth piece body are located at the upper side and the lower side of the side rail, respectively, and contact the upper end surface and the lower end surface of the side rail, respectively. The eighth piece body is located at the side of the side rail and contacts the side end surface of the side rail. For a better fit, the eighth piece body is provided with the first hole 55, and the connecting member passes through the first hole by the connecting screw 54 to be fastened with the side rail. The end surface of the eighth piece body facing opposite to the side rail is provided with the fourth piece body 46, the fifth piece body 47 and the sixth piece body 48 that are connected to form the second U-shaped groove. The same parts and structures described above with respect to the first U-shaped groove may be equally applied to the description of the second U-shaped groove.

The preferred embodiments of the present invention have been described by the foregoing description. As mentioned above, it should be understood that the present invention is not limited to the preferred embodiments disclosed herein and should not be construed as an exclusion from other embodiments. The present invention can be used in various other combinations, modifications, and environments, and can be modified within the scope of the present invention described herein based on the above teachings or technology or knowledge in the related field. The modifications and variations made by those skilled in the art without departing from the spirit and scope of the present invention shall fall within the scope of protection of the appended claims of the present invention.

What is claimed is:

1. A mounting structure for a bedstead, comprising:
a side rail of the bedstead, and
a cross rail of the bedstead;
wherein
the side rail and the cross rail are connected by a connecting member; the connecting member comprises a body; the body is provided with a first U-shaped groove, wherein the side rail is clamped in the first U-shaped groove; a second U-shaped groove is provided on a side of the body, wherein the side of the body is beside the first U-shaped groove, and the cross rail in clamped in the second U-shaped groove; and an opening of the second U-shaped groove faces sideward relative to the first U-shaped groove, wherein, an opening of the first U-shaped groove faces downward, wherein, the body comprises a first piece body, a second piece body and a third piece body;

the first piece body, the second piece body and the third piece body are connected to form the first U-shaped groove; the first piece body and the third piece body are located at two sides of the side rail, respectively, and the first piece body and the third piece body contact two side end surfaces of the side rail, respectively; the second piece body is located above the side rail and contacts an upper end surface of the side rail, wherein, a first end surface of the first piece body and/or the third piece body is provided with a protruding column, wherein the first end surface of the first piece body and/or the third piece body is in contact with the side rail; and the side rail is provided with a first hole matched with the protruding column, wherein, an outer diameter of the protruding column gradually increases from a first end of the protruding column to a second end of the protruding column, wherein the first end of the protruding column is inserted into the first hole.

2. The mounting structure for the bedstead according to claim 1, wherein, the first piece body is provided with a second hole, the side rail is provided with the first hole, and the first hole coincides with the second hole; and a connecting screw is screwed through the second hole and the first hole.

3. The mounting structure for the bedstead according to claim 1, wherein, a second end surface of the third piece body is provided with a fourth piece body, a fifth piece body and a sixth piece body, wherein the second end surface of the third piece body is opposite to a first end surface of the third piece body, wherein the first end surface of the third piece body is in contact with the side rail; the fourth piece body, the fifth piece body and the sixth piece body are connected to form the second U-shaped groove; the fourth piece body and the sixth piece body contact a front end surface and a rear end surface of the cross rail, respectively; an upper end surface of the sixth piece body contacts a lower end surface of the cross rail.

4. The mounting structure for the bedstead according to claim 3, wherein, an end of each of the fourth piece body and the sixth piece body is provided with a curved surface, wherein the end of each of the fourth piece body and the sixth piece body is away from the fifth piece body.

5. The mounting structure for the bedstead according to claim 1, wherein, the opening of the first U-shaped groove faces laterally relative to the side rail.

6. The mounting structure for the bedstead according to claim 1, wherein, the body comprises a seventh piece body, an eighth piece body, and a ninth piece body; the seventh piece body, the eighth piece body and the ninth piece body are connected to form the first U-shaped groove; the seventh piece body and the ninth piece body are located at an upper end and a lower end of the side rail, respectively, and contact an upper end surface and a lower end surface of the side rail, respectively; the eighth piece body is located at a side of the side rail and contacts a side end surface of the side rail.

7. The mounting structure for the bedstead according to claim 2, wherein, a second end surface of the third piece body is provided with a fourth piece body, a fifth piece body and a sixth piece body, wherein the second end surface of the third piece body is opposite to a first end surface of the third piece body, wherein the first end surface of the third piece body is in contact with the side rail; the fourth piece body, the fifth piece body and the sixth piece body are connected to form the second U-shaped groove; the fourth piece body and the sixth piece body contact a front end surface and a rear end surface of the cross rail, respectively; an upper end surface of the sixth piece body contacts a lower end surface of the cross rail.

8. The mounting structure for the bedstead according to claim 1, wherein, a second end surface of the third piece body is provided with a fourth piece body, a fifth piece body and a sixth piece body, wherein the second end surface of the third piece body is opposite to the first end surface of the third piece body, wherein the first end surface of the third piece body is in contact with the side rail; the fourth piece body, the fifth piece body and the sixth piece body are connected to form the second U-shaped groove; the fourth piece body and the sixth piece body contact a front end surface and a rear end surface of the cross rail, respectively; an upper end surface of the sixth piece body contacts a lower end surface of the cross rail.

9. The mounting structure for the bedstead according to claim 1, wherein, a second end surface of the third piece body is provided with a fourth piece body, a fifth piece body and a sixth piece body, wherein the second end surface of the third piece body is opposite to the first end surface of the third piece body, wherein the first end surface of the third piece body is in contact with the side rail; the fourth piece body, the fifth piece body and the sixth piece body are connected to form the second U-shaped groove; the fourth piece body and the sixth piece body contact a front end surface and a rear end surface of the cross rail, respectively; an upper end surface of the sixth piece body contacts a lower end surface of the cross rail.

10. The mounting structure for the bedstead according to claim 7, wherein, an end of each of the fourth piece body and the sixth piece body is provided with a curved surface, wherein the end of each of the fourth piece body and the sixth piece body is away from the fifth piece body.

11. The mounting structure for the bedstead according to claim 8, wherein, an end of each of the fourth piece body and the sixth piece body is provided with a curved surface, wherein the end of each of the fourth piece body and the sixth piece body is away from the fifth piece body.

12. The mounting structure for the bedstead according to claim 9, wherein, an end of each of the fourth piece body and the sixth piece body is provided with a curved surface, wherein the end of each of the fourth piece body and the sixth piece body is away from the fifth piece body.

* * * * *